Sept. 22, 1959

R. G. WAMPACH 2,905,746

TELEGRAPH STATION SELECTOR

Filed April 23, 1954

INVENTOR
ROBERT G. WAMPACH

BY Emery Robinson

ATTORNEY

Sept. 22, 1959  R. G. WAMPACH  2,905,746
TELEGRAPH STATION SELECTOR

Filed April 23, 1954  2 Sheets-Sheet 2

INVENTOR
ROBERT G. WAMPACH
BY *Emery Johnson*
ATTORNEY

United States Patent Office 2,905,746
Patented Sept. 22, 1959

2,905,746

TELEGRAPH STATION SELECTOR

Robert G. Wampach, Roselle, Ill., assignor to Teletype Corporation, Chicago, Ill., a corporation of Delaware Application April 23, 1954, Serial No. 425,175

10 Claims. (Cl. 178—4.1)

The invention relates to telegraph station selectors and more particularly to station selectors permanently incorporated within a system whereby certain station selectors are operated by a series of signals to condition telegraphic apparatus associated therewith for receipt of subsequently transmitted messages and certain other station selectors are operated by other series of signals to preclude the recording of messages subsequently transmitted through the system.

In many telegraph communication systems having numerous stations adapted to transmit and receive messages, it is often desirable to provide selectively operated apparatus at each station to select certain stations to receive messages and to preclude certain other stations from receiving said messages. Heretofore, such systems have been developed whereby use was made of complicated relay circuits or other bulky mechanisms for attaining the desired selections. Use of these prior devices has been obviously space consuming, difficult to maintain, or limited in adaptability to incorporation in different types of receiving equipment.

It is a primary object of this invention to provide a compact and simple station selector adapted to be readily incorporated in many diverse types of telegraph recording apparatus.

Another object of the present invention resides in a station selector employing reliable electrical storage elements which are operated sequentially to either select a recorder to receive a message or preclude said recorder from responding to said message.

A further object of the invention is to provide station selectors utilizing the sequential operation of electronic tubes for precluding the operation of the telegraph recorder by either disabling a motor associated with said recorder or shunting the receiving magnets in the recorder or by physically blocking the operation of printing elements within the recorder.

An additional feature of the invention resides in a station selector having receiver enabling and disabling means together with means for preventing the operation of the disabling means subsequently to the operation of the enabling means.

The present invention is described in relation to a telegraph tape printer of the type shown in the patent to W. J. Zenner, No. 2,339,313, dated January 18, 1944. However, it is to be understood that the station selector hereinafter described may be readily incorporated in practically all types of existing printing or other recording devices operated in accordance with the receipt of telegraph signals. In the following description only those parts of the Zenner tape printer facilitating an understanding of the present invention will be discussed and the reader's attention is directed to the Zenner patent specification for a complete description of the details of the printer.

With these and other objects in view, the present invention contemplates a station selector comprising two pairs of electronic tubes for controlling the disablement of a telegraph recorder. A number of stations are connected in a system and each has associated therewith one of said station selectors adapted to be operated by the receipt of a predetermined sequence of two signals. The transmission of a sequence of two predetermined telegraph signals sequentially effectuates the operation of a first pair of the electronic tubes at the station to which it is desired to transmit a message. When all the stations to which the message is to be transmitted have been selected, then a second predetermined sequence of two telegraph signals is transmitted which will sequentially actuate the other pair of tubes at all the nonselected stations. The operation of the second tube pair at the nonselected station actuates instrumentalities to preclude the associated recording apparatus from responding to the subsequently transmitted messages.

When the last tube of the first pair of tubes is operated at a station, the control circuit of that tube is actuated to preclude the first of said second pair of tubes from operation in response to the receipt of the signals which would normally disable the nonselected stations.

Other objects and advantages of the present invention will be apparent from the following detailed description, when considered in conjunction with the accompanying drawings wherein.

Figure 1:
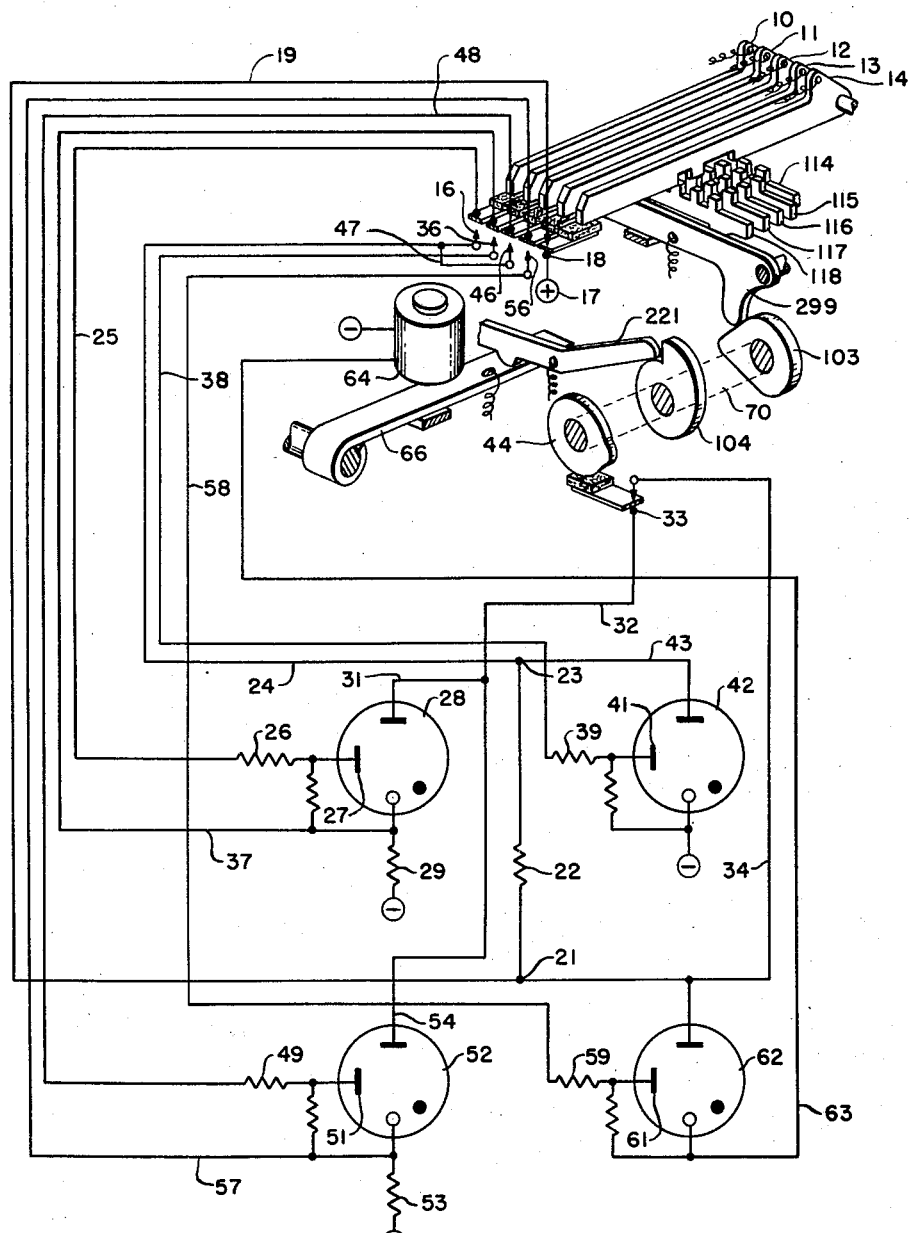
Fig. 1 is a circuit diagram showing the principal features of the invention and the manner in which said circuit can be connected to a typical telegraph recording apparatus.

Referring to the upper right-hand corner of Fig. 1 there are shown several component parts of a printing telegraph apparatus such as illustrated and described in the aforeidentified Zenner patent. Wherever possible, numerical designations for parts of the printer will be selected as identical to the designations used in the Zenner patent. More particularly, in the present disclosure and in the Zenner patent there is disclosed a plurality of selectively actuated sliding bars 114 to 118 which are adapted to be permutatively positioned in accordance with the incoming telegraph signals. The selected positionment of the slidable bars 114 to 118 controls the particular type of character that is to be recorded or said permutative positionment can control the selection of one of a group of five selector bars 10, 11, 12, 13 and 14.

It is to be understood that in a system having a plurality of interconnected stations, each will be provided with station-selector mechanisms such as disclosed in Fig. 1. However, each station will be provided with special bars 10 and 11 coded in a manner to represent that particular station. The remainder of the bars 12, 13 and 14 will be permutatively notched in an identical manner.

As described in the Zenner patent, the receipt of a start impulse effectuates the impartation of rotation to a shaft 70 having mounted thereon cams 103 and 104 identical to the similarly designated cams shown in said Zenner patent. The cam 103 is adapted to control the positionment of a lever 299. At the start of rotation of the shaft, said lever engages the underside of the selector bars 10 to 14 to further raise them clear of the slidable bars 114 to 118 and then lower said selector bars into engagement with said slidable bars where one of the selector bars may be permitted to move further than the others if the notches formed therein coincide with the permutation of projections presented by said slidable bars. Cam 104 is adapted to operate just prior to the completion of a cycle of rotation of the shaft 70 and the lobe formed thereon operates a print hammer lever 221 to cause a character to be recorded and further to step the recording medium into position to have a subsequently received character printed thereon.

Associated with the selector bar 10 is a normally open contact pair 16 adapted to be closed upon movement of the bar 10 in accordance with the receipt of a first predetermined call letter which, for purposes of this description, will be selected as the letter A. Closure of contact pair 16 completes a circuit which may be traced from positive battery 17, through a normally closed contact 18 associated with the "Blank" selector bar 14, over a lead 19, through a junction point 21, through a resistance 22, through a junction point 23, over a lead 24, through the now closed contact pair 16, over a lead 25, through a resistance 26 to a starter anode 27 of a cold cathode gas tube 28. Tube 28 has its cathode connected through a resistance 29 to negative battery, and the anode of this tube is connected over a lead 31, over a lead 32, through a cyclically operable timing contact 33, over a lead 34, to the junction point 21, which, as previously explained, has positive battery applied thereto. The cylically operable contact 33 is adapted to be opened for a short period during each revolution of the shaft 70 by means of a cam 44 mounted thereon. Tube 28 is therefore placed in a conductive state. This tube possesses the characteristic of remaining conductive after being initially fired even though the firing potential is removed from the starter anode 27 and can be quenched by raising the cathode potential or lowering or removing the anode potential. The effect of opening the contact 33 is to render the tube nonconducting for only an instant as the contact 33 recloses before the contact pair 16 opens.

Positioned next to the selector bar 10 is the selector bar 11 which is adapted to move downwardly upon receipt in the receiving equipment of a second predetermined signal which, for purposes of this description, will be considered as indicative of the letter B. Downward movement of the bar 11 causes a contact pair 36 to close, thereby completing a circuit which may be traced from a point between resistance 29 and the cathode of tube 28, over a lead 37, through the now closed contact pair 36, over a lead 38, through a resistance 39, to a starter anode 41 of a second cold cathode gas tube 42. This tube has its cathode connected to negative battery and the anode thereof is connected over a lead 43 to the junction point 23 which as previously explained, has positive battery applied thereto. When the tube 28 was rendered conductive, the potential of the cathode rises due to the current flowing through resistance 29. Consequently, closure of the contact pair 36 applies a potential to the starter anode 41 to render the tube 42 conductive.

Figure 2:
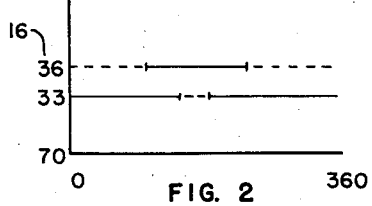
Fig. 2 is a timing diagram illustrating the period of closure of various contacts shown in Fig. 1 with respect to the period of rotation of a printer operating shaft.

Attention is now directed to the timing diagram, Fig. 2, wherein the period of operation of the shaft 70 is illustrated as the lower solid line. The solid portion of the top line represents the time that the contacts 16 and 36 are closed during each cycle of operation of the shaft 70. The solid portion of the middle line represents the time that the contact 33 is closed. It may be observed that the contact 33 opens and closes fully within the period of closure of the contact pair 16. Consequently, after the contact pair 16 closes to energize the tube 28, the removal of positive battery by the opening of contact 33 from the anode of tube 28 functions to de-energize the tube. Contact 33 closes again prior to the opening the contact pair 16, consequently, the tube 28 is re-energized. It may be noted that if the selector bars 10 and 11 are not operated in a contiguous sequence by the reception of the signals AB, then the contact 33 will open during receipt of a signal other than the B signal to de-energize the tube 28, thereby preventing the subsequent operation of the tube 42. When the tubes 28 and 42 have been operated, the station is considered to be selected.

When it is desired to disable certain stations in the system, a sequence of signals is transmitted which in the present description will be considered representative of "Figures" and "Carriage Return" functions. Assuming that tubes 28 and 42 have not been sequentially operated and that the station shown in Fig. 1 is to be precluded from receiving a message, then the receipt of the signal representative of a "Figures" function causes the selector bar 12 to move downwardly to close a contact pair 46. Closure of this contact pair completes a circuit which may traced from the junction point 23 which, as previously described, has positive battery applied thereto, over the lead 24, over a lead 47, through the now closed contact pair 46, over a lead 48, through a resistance 49 to a starter anode 51 of a third cold cathode gas tube 52. The cathode of the tube 52 is connected through a resistance 53 to negative battery, and its anode is connected over a lead 54, over the lead 32, through the cyclically operable contact 33, over the lead 34 to the junction point 21, which, as previously indicated has positive battery applied thereto. The appearance of a positive potential on the starter anode 51 renders the tube 52 conductive and this tube remains conductive even though the initiating potential is removed from the starter anode 51.

The reception of the second signal of the disabling sequence, the "Carriage Return" signal, causes the selector bar 13 to move downwardly to close a contact pair 56 to complete a circuit which may be traced from a point between the cathode of the tube 52 and the resistance 53, over a lead 57, through the now closed contact pair 56, over a lead 58, through a resistance 59 to a starter anode 61 of a fourth cold cathode gas tube 62. The cathode of this tube is connected over a lead 63 and through a strong electromagnet 64 to negative battery. The anode of tube 62 is connected to the junction point 21 which, as previously indicated, has positive battery applied thereto. Obviously the appearance of a positive potential on the starter anode 61 causes the tube 62 to be rendered conductive. The passage of current through this tube causes current to flow through the magnet 64. Energization of the magnet 64 draws up a pivotally mounted, spring biased armature 66, causing the print hammer operating lever 221 to be moved from its cam 104. Inasmuch as the cam 104 and lever 221 control the printing and spacing of the recorder, the disablement of the lever 221 precludes the recorder at this station from recording any characters received from the distant transmitting station.

Attention is directed to the fact that upon receipt of each, whether it be a signal representative of a "Figures" or a "Carriage Return" function, the cam 44 operates the contact 33. Thus, during the closure of the contact pair 46 the contact 33 is opened to remove positive potential from the anode of the tube 52 whereupon this tube is rendered nonconducting, but the contact 33 closes before the contact 46 opens thereby permitting tube 52 to re-energize. The tube 52 is de-energized by the opening of the contact 33 during the receipt of the next succeeding signal, but if this succeeding signal is a "Carriage Return" signal, then the tube 62 is rendered conductive prior to the opening of the contact 33.

Consider now the situation where the tubes 28 and 42 are sequentially operated and the tube 42 is maintained in a continually conductive state due to positive potential being applied to its anode. Such positive potential may be traced through junction point 23, resistance 22, junction point 21, over lead 19, through the normally closed "Blank" contacts 18 to the source of positive potential 17. When the tube 42 was rendered conductive, the potential at junction point 23 instantly drops due to a voltage drop across resistance 22. Manifestly, when a "Figures" signal is received to close contact pair 46, the reduced potential of junction point 23 is applied over lead 24, over lead 47, through the now closed contact pair 46, over the lead 48, through the resistance 49 to the starter anode of tube 52. This potential, being of a reduced value from the condition previously described in regard to the operation of tube 52, is insufficient to render the tube 52 conductive. Thus with the tube 52 being incapable of being rendered conductive, the tube 62 is likewise not rendered conductive upon the subsequent reception of a signal representative of a "Carriage Return" function and the disabling magnet 64 is not operated.

In summation of the operation of the station selector circuit shown in Fig. 1, the successive receipt of signals representative of letters A and B causes the sequential operation of the tubes 28 and 42. Operation of the tube 42 lowers the potential of junction point 23 whereby the subsequent reception of the sequence of signals representative of the "Figures" and "Carriage Return" functions does not operate the tubes 52 and 62. At the stations in the system where the tubes 28 and 42 have not been operated, the receipt of the disabling signals, namely, the "Figures" and "Carriage Return" sequence, causes the sequential operation of the tubes 52 and 62. Operation of the tube 62 completes a circuit for energizing the magnet 64 to draw up the armature 66 whereupon the printing and spacing lever 221 is removed from its cam to preclude this station from recording messages subsequently transmitted from some outlying station.

In order to clear all stations following transmission of messages to the designated stations, a signal representative of a "Blank" function is transmitted to all stations. Receipt of this signal causes a selector bar 14 to move downwardly thereby opening the normally closed contact 18. In the previous discussion, it was pointed out that the source of all positive potentials was derived from the source 17 which is connected to the contact 18. Thus, the opening of this contact removes positive potential from any conducting tubes, thereby rendering these tubes nonconducting and restoring the selector devices at each station to an unoperated condition preparatory to the receipt of subsequent call and disabling signals.

Figure 3:
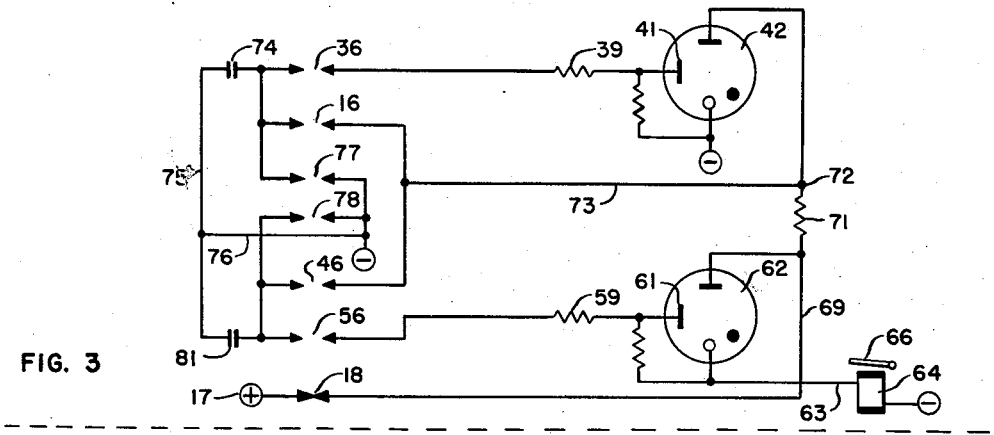
Fig. 3 is a modified form of station selector embodying many of the features shown in the embodiment of the invention illustrated in Fig. 1.

Referring now to Fig. 3, wherein an alternative embodiment of the invention is shown, the reference numeral 64 is again utilized to designate the disabling magnet previously described in regard to the embodiment of the invention shown in Fig. 1. In a like manner, other elements which are identical in the two embodiments are identified by like reference numerals. The receipt of a letter A in the sequence of signals AB first effectuates the closure of the contact pair 16 to apply positive battery from the source 17, through the normally closed "Blank" contacts 18, over a lead 69, through a resistance 71, through a junction point 72, over a lead 73, through the now closed contact pair 16 to the right-hand side of a condenser 74. The opposite side of the condenser 74 is connected over leads 75 and 76 to a source of negative battery. When the second signal of the sequence, the letter B, is received, the contact pair 36 is closed, and the positive potential applied to the condenser 74 is impressed through the now closed contact pair 36, through the resistance 39 and to the starter anode 41 of the gas tube 42. During the receipt of each signal, two timing contacts 77 and 78 are closed. These contacts are only closed for a short duration that is within the period of closure of any of the other contact pairs 16, 36, 46 and 56. If the first signal of the sequence were not the letter A, then the contact 16 would not have been closed and the closure of the cyclically operable contact 77 would apply negative battery to both sides of the condenser 74 thereby preventing this condenser from being charged positively. Consequently, even if the next signal received were the letter B the closure of the contact pair 36 would not apply positive potential to the starter anode 41.

When it is desired to disable a particular station, the sequence of signals representative of the "Figures" and "Carriage Return" functions are transmitted. Receipt of the "Figures" signal effectuates the closure of the contact pair 46, whereupon positive battery is impressed from junction point 72, over lead 73, through the now closed contact pair 46 to one side of a condenser 81. The other side of the condenser is connected through lead 76 to negative battery. Thus, the closure of contact pair 46 results in the charging of the condenser 81. Receipt of the second disabling signal in the sequence (the "Carriage Return" signal) causes the closure of the contact pair 56, thereby applying the positive potential on the condenser 81 through the now closed contact pair 56, through the resistance 59 to the starter anode 61 of the cold cathode gas tube 62. This tube is instantly rendered conducting to complete a circuit for the operation of the maget 64. Energization of the magnet 64 draws up its armature 66 to disable the recording mechanism at this station.

In the situation where the tube 42 has been operated, which is indicative of the selection of that station, then the potential on the junction point 72 drops. As the next group of signals received by said station is representative of the disabling sequence, then the receipt of the "Figures" signal will close the contact pair 46; but, as the potential of the junction point 72 has dropped, the closure of this contact is ineffective to charge the condenser. Manifestly, the subsequent closure of the contact pair 56 in response to the subsequent receipt of the "Carriage Return" signal is ineffective to apply sufficient positive potential to the anode 61 to render conductive the cold cathode gas tube 62. As a result, a disabling mechanism at this station is not actuated in response to this signal.

Figure 4:
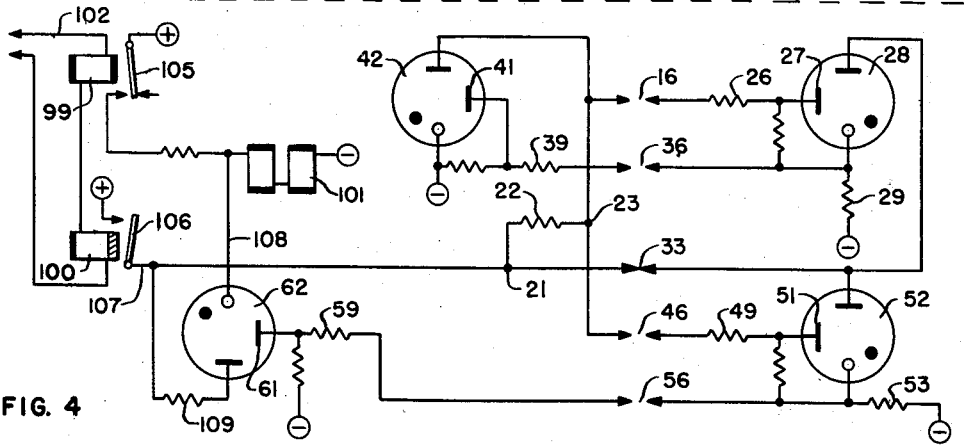
Fig. 4 is a circuit diagram showing a further modified form of the invention wherein means are provided for disabling selector magnets incorporated in a telegraph receiver.

In Fig. 4 an additional embodiment of the invention is illustrated wherein non-selected stations are made non-responsive to message signals by shunting a pair of selector magnets 101 with respect to the signal responsive circuit. The selector magnets 101 control the permutative positionment of the selectively slidable bars 114 to 118 and, as previously indicated, these bars control the printing of the characters as well as the selection of the selector bars 10 to 14. In the description of Fig. 4, where elements are identical with the elements shown in Fig. 1, identical designations are utilized.

In this instance, when it is desired to effectuate a station selection, a signal line 102 is first de-energized to thereby de-energize a line magnet 99 and a slow-to-release magnet 100 connected in said line. The signal line is de-energized for a period of approximately one second which is equal to the time in which several signals would be normally transmitted over the line. De-energization of slow-to-release magnet 100 allows its armature 106 to disconnect positive battery from a lead 107 which is connected to all of the tubes thereby placing all these tubes in a nonconductive state in anticipation of the receipt of station selecting and non-selecting signals.

Upon receipt of signals representative of the letters A and B, which are the call letters for the station circuit shown in Fig. 4, the line magnet 99 is energized and de-energized to accordingly position a selector armature 105 to control the energization and de-energization of the selector magnets 101 which control the positioning of the selectively slidable bars 114 to 118. As soon as signals are impressed on the line 102, the magnet 100 is energized and is held in this condition to draw the armature 106 into position to again apply positive battery therethrough to the lead 107. Again, as previously indicated, the tubes 28 and 42 are sequentially energized in the manner discussed in the embodiment of the invention shown in Fig. 1. The energization of tube 42 causes its anode potential to drop and, as a result, the potential at the junction point 23 also drops.

Assuming that station AB has not been selected, then the tubes 28 and 42 are de-energized and the subsequent receipt of the "Figures-Carriage Return" sequence successively renders the tubes 52 and 62 conductive. When the tube 62 is rendered conductive, a circuit is completed from negative battery, through the selector magnets 101, over a lead 108, through the tube 62, through a resistance 109, over the lead 107, through the drawn-up armature 106 to positive battery. This circuit obviously holds the selector magnets 101 in an energized condition irrespective of the position of the armature 105, consequently, the selector magnets 101 will not respond to subsequently transmitted message signals.

In the situation where tubes 28 and 42 have been successively operated, then the subsequent reception of the "Figures" and "Carriage Return" signals is ineffective to sequentially operate the tubes 52 and 62. This is true because the operation of the tube 42 results in a voltage drop through resistance 22, thereby lowering the potential of the junction point 23 so that upon closure of the "Figures" contact pair 46, insufficient potential is applied to the starter anode 51 to render tube 52 conducting. Inasmuch as tube 52 is not rendered conductive, the subsequent closure of the "Carriage Return" contact pair 56 is ineffective to render tube 62 conductive.

Figure 5:
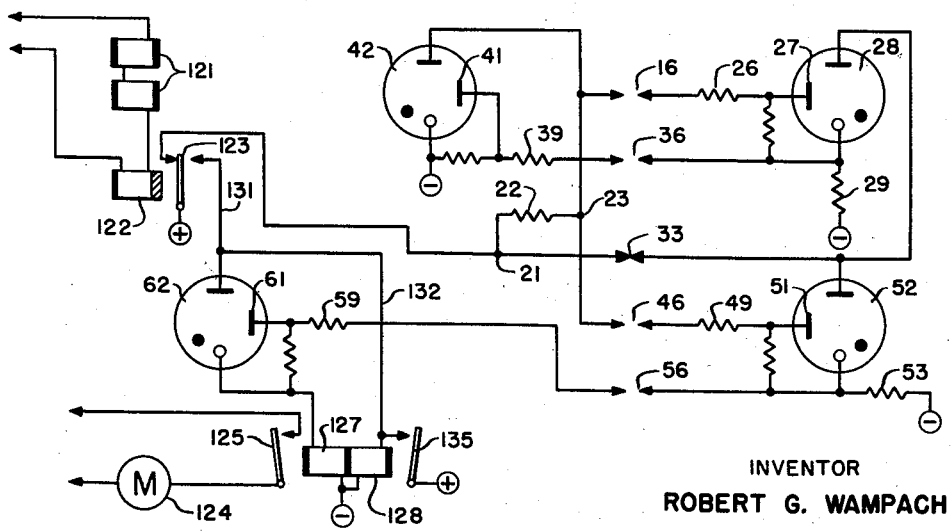
Fig. 5 is another circuit diagram showing a still further embodiment of the invention wherein facilities are provided for interrupting the operation of a motor connected to a telegraph receiver.

A further embodiment of the invention is illustrated in Fig. 5 where many of the components previously discussed in regard to the embodiments shown in Figs. 1, 3 and 4 are again employed, and consequently identical numerical designations are used. In this embodiment, a pair of selector magnets 121 is connected directly in the receiving line circuit. There is also connected in this circuit a slow-to-release magnet 122 which is adapted to control an armature 123 connected to positive battery. Referring to the lower left-hand portion of the figure, there is schematically illustrated a motor 124 adapted to drive a receiving printer so that if said motor is de-energized, the printer will not respond to incoming line signals. Connected in the control circuit of the motor 124 is an armature 125 which is adapted to be controlled by a double wound relay having coils 127 and 128.

In operation of a station selector system where each of the stations is provided with a station selector such as shown in Fig. 5, and assuming that all motors at each station are not running, then the signal line is de-energized for a period equal to the time that would be necessary to transmit several signals. Slow-to-release magnet 122 de-energizes and allows its armature 123 to engage the back contact thereof, thereby applying positive battery through said armature 123, over a lead 131, over a lead 132, through the right-hand coil 128 to negative battery. Energization of the coil 128 draws up its front contact 135 to complete a locking circuit for this coil. Energization of coil 128 also draws up the armature 125 to complete an energizing circuit for the motor 124.

Again, as previously described, the station shown in Fig. 5 is selected by the transmission of signals representative of A and B characters which close the contact pairs 16 and 36 to sequentially energize the tubes 28 and 42. Following the selection of the stations in the system, the sequence of signals representative of the "Figures" and "Carriage Return" functions is transmitted. If the tubes 28 and 42 have not been operated, then the sequential closing of the contacts 46 and 56 results in the sequential energization of the tubes 52 and 62. When tube 62 is energized, a circuit is completed from positive battery through the drawn up contact 135, over lead 132, through the tube 62, through the coil 127, to negative battery. The coil 127 is wound in a fashion opposite to that of the winding of the coil 128; consequently, the magnetic field set up by the energization of the coil 127 opposes the field set by the coil 128. The energization of coil 127 thereby opens the contacts 125 and 135. Opening of the contact 125 interrupts the circuit to the motor 124, thus precluding the printer located at this station from receiving the subsequently transmitted message. When the contact 135 is opened, positive battery is removed from the anode of the tube 62 and since the armature 123 now engages its front contact, the tube 62 is rendered non-conducting.

In the situation where the station shown in Fig. 5 is selected, that is, where the tube 42 is in a conductive state, then the potential at the junction point 23 is lowered due to the voltage drop in the resistance 22 connected between junction point 23 and the drawn-up armature 123. When the disabling sequence of signals ("Figures"-"Carriage Return") is received, the closure of the contact pair 46 applies the reduced potential of junction point 23 to the starter anode 51 of the tube 52. Inasmuch as this potential is of a reduced value, it is insufficient to render the tube 52 conducting; therefore, when the contact 56 is subsequently closed, there is no starting potential available from the cathode of tube 52 for application to the starter anode 61 to render conducting the tube 62.

It is to be understood that the above described arrangements of circuit components and construction of elemental parts are simply an illustration of the application of the principles of the invention and many other modifications may be made without departing from the invention.

What is claimed is:

1. A station selector for a teleprinter having a communication channel connected thereto, which comprises a first electronic tube, means responsive to a first predetermined signal over said channel for operating said first tube, a second electronic tube, normally open contact means for applying the voltage on a control element of the first tube to a control element of the second tube, means responsive to a second predetermined signal over said channel for closing said contact means to operate said second tube when said first tube is operated, means responsive to a sequence of signals over said channel for disabling said teleprinter from printing, and means controlled by the operation of said second tube for precluding the operation of said disabling means.

2. In an automatic telegraph station selector, a first pair of electronic tubes coupled together so that operation of the first conditions the second for operation, means responsive to a first predetermined sequence of successive signals for sequentially operating said first pair of tubes, a second pair of electronic tubes coupled together so that operation of the first conditions the second for operation, means responsive to a second predetermined sequence of successive signals for sequentially operating said second pair of tubes, means operated by the operation of the second tube of the second pair for precluding said station from responding to message signals, and means controlled by the operation of the second tube of the first pair for preventing the operation of the second tube of the second pair.

3. In a station selector for a telegraph printer, a first pair of electronic tubes interconnected together so that the operation of the second is predicated upon the operation of the first, means responsive to a first predetermined sequence of signals for sequentially operating the tubes, a second pair of electronic tubes interconnected together so that the operation of the second is predicated upon the operation of the first, means responsive to a second predetermined sequence of signals for sequentially operating the second pair of tubes, a source of positive potential for maintaining operation of said second tube of the first pair and for initiating operation of the first tube of the second pair, a common resistance connected between said tubes and source of potential whereby conduction of said second tube of said first pair causes a voltage drop in said resistance to preclude the operation of the first tube of said second pair, and means operated by the second of the second pair of tubes for precluding the operation of the printer.

4. In a station selector for a telegraph printer, means normally ineffective for precluding the operation of the printer, a source of positive potential, a pair of first electronic tubes, means interconnecting said first electronic tubes for conditioning the second tube for operation when the first is operated, a resistance interconnecting the anode of the first tube with the source of positive potential, means responsive to a first sequence of signals for sequentially operating the first tube to condition the second and then said conditioned tube, a second pair of tubes each having a control electrode, means interconnecting said second pair of tubes for conditioning the second tube thereof for operation when the first is operated, means responsive to a second predetermined sequence of signals for sequentially operating the first tube to condition the second and then said conditioned tube, means operated by said second tube of said second pair for rendering effective said precluding means, and means connecting said control electrode of said first tube of said second pair to the anode of the second tube of the first pair whereby the conduction of said second tube of the first pair produces a voltage drop in said resistance to preclude the operation of the first tube of said second pair.

5. A station selector for a printer included in a multistation telegraph system, comprising a first tube having a control electrode and a cathode connected by a resistance, a first normally open contact means connected to said control electrode, a second electronic tube having a control electrode, a second normally open contact means interconnecting the cathode of the first tube to the control electrode of the second tube, means responsive to a first predetermined signal for closing said first contact means to operate said first electronic tube whereupon the cathode potential thereof rises, means responsive to a second predetermined signal for closing the second contact means whereby the cathode potential of the first tube is applied to the control electrode of the second tube to operate the second tube, a third electronic tube having a control electrode and a cathode connected by a resistance, a third normally open contact means connected to said control electrode of said third tube, a fourth electronic tube having a control grid, a fourth normally open contact means interconnecting the cathode of said third tube and said control electrode of the fourth tube, means responsive to a third predetermined signal for closing said third contact means to operate said third tube, means responsive to a fourth predetermined signal for closing said fourth contact means to apply the cathode potential of said third tube to the control electrode of the fourth tube whereupon said fourth tube is operated, means controlled by the operation of the fourth tube for disabling said printer from responding to message signals, and means controlled by the operation of the second tube for precluding the operation of the fourth tube.

6. In a station selector for a remote controlled printing telegraph apparatus having a normally operating drive motor, a first pair of electronic tubes connected together to be sequentially operated, means responsive to a first pair of predetermined signals for sequentially operating said first pair of tubes, a second pair of electronic tubes connected together to be sequentially operated, means responsive to a second pair of predetermined signals for sequentially operating said second pair of tubes, means operated by the operation of the last of said second pair of tubes for disrupting the operation of the motor, and means controlled by the operation of the last of said first pair of tubes for precluding the operation of the last of said second pair of tubes.

7. A station selector for a teleprinter having a communication channel connected thereto, which comprises a circuit for generating a predetermined potential, an electronic tube, means connecting the circuit to a control element of the tube such that operation of the circuit conditions the tube for operation, means responsive to a first predetermined sequence of successive signals for sequentially operating the circuit and the tube, a second circuit for generating a second predetermined potential, a second electronic tube, means connecting the second circuit to a control element of the second tube such that operation of the circuit conditions the tube for operation, means responsive to a second predetermined sequence of successive signals for sequentially operating the second circuit and the second tube, means operated by the operation of the second tube for precluding the teleprinter from responding to signals received from the communication channel, and means controlled by the operation of the first tube for preventing the operation of the second tube.

8. A station selector for a teleprinter according to claim 7 wherein the teleprinter includes a selector magnet for responding to signals including the sequences of signals for controlling said first and second tubes, and the means operated by the second tube for precluding response of said teleprinter to signals includes a circuit path for maintaining said selector magnet continuously energized.

9. A station selector for a teleprinter according to claim 7 wherein each of the circuits for generating a predetermined potential includes an energy storage device, means responsive to a first signal of each of said sequences of signals for storing energy in a respective one of the storage devices, normally open contact means interconnecting the storage devices of the first and second potential generating circuits and the control elements of the first and second tubes, respectively, and means responsive to another signal of each of said sequences for closing the contact means to apply the stored energy to the control elements of the first and second electronic tubes, respectively.

10. A station selector for a teleprinter according to claim 7 wherein the first and second circuits for generating a predetermined potenial each include a capacitor chargeable under control of a first signal of a sequence and the means connecting each circuit to the control element of the associated tube includes a normally open contact closable in response to another signal of a sequence to connect the capacitor to the control element of the associated tube.

References Cited in the file of this patent

UNITED STATES PATENTS

| | | |
|---|---|---|
| 1,943,475 | Gurley | Jan. 16, 1934 |
| 2,495,452 | Grove | Jan. 24, 1950 |
| 2,570,279 | Ridler et al. | Oct. 9, 1951 |